(12) United States Patent
Cheriton et al.

(10) Patent No.: US 8,401,027 B2
(45) Date of Patent: Mar. 19, 2013

(54) METHOD FOR TRAFFIC MANAGEMENT, TRAFFIC PRIORITIZATION, ACCESS CONTROL, AND PACKET FORWARDING IN A DATAGRAM COMPUTER NETWORK

(75) Inventors: David R. Cheriton, Palo Alto, CA (US); Andreas V. Bechtolsheim, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 235 days.

(21) Appl. No.: 12/237,546

(22) Filed: Sep. 25, 2008

(65) Prior Publication Data

US 2009/0046734 A1 Feb. 19, 2009

Related U.S. Application Data

(63) Continuation of application No. 10/725,968, filed on Dec. 2, 2003, now Pat. No. 7,443,858, which is a continuation of application No. 09/482,940, filed on Jan. 14, 2000, now Pat. No. 6,798,776, which is a continuation of application No. 08/581,134, filed on Dec. 29, 1995, now Pat. No. 6,091,725.

(51) Int. Cl.
*H04L 12/54* (2006.01)
*H04L 29/02* (2006.01)

(52) U.S. Cl. ......... 370/397; 370/412; 370/231; 370/236

(58) Field of Classification Search ............... 370/235, 370/236, 242, 248, 352, 390, 395.53, 395.71, 370/397, 412, 418, 468
See application file for complete search history.

(56) References Cited

U.S. PATENT DOCUMENTS

| | | | |
|---|---|---|---|
| 4,131,767 A | 12/1978 | Weinstein | |
| 4,161,719 A | 7/1979 | Parikh et al. | |
| 4,316,284 A | 2/1982 | Howson | |
| 4,397,020 A | 8/1983 | Howson | |
| 4,419,728 A | 12/1983 | Larson | |

(Continued)

FOREIGN PATENT DOCUMENTS

| | | |
|---|---|---|
| EP | 0384758 | 2/1990 |
| EP | 0384758 A2 | 8/1990 |

(Continued)

OTHER PUBLICATIONS

William Stallings, Data and Computer Communications, pp. 329-333, Prentice Hall, Upper Saddle River, New Jersey 07458.

(Continued)

*Primary Examiner* — Marsha D. Banks Harold
*Assistant Examiner* — Matthew Campbell
(74) *Attorney, Agent, or Firm* — Baker Botts L.L.P.

(57) ABSTRACT

The invention provides an enhanced datagram packet switched computer network. The invention processes network datagram packets in network devices as separate flows, based on the source-destination address pair in the datagram packet. As a result, the network can control and manage each flow of datagrams in a segregated fashion. The processing steps that can be specified for each flow include traffic management, flow control, packet forwarding, access control, and other network management functions. The ability to control network traffic on a per flow basis allows for the efficient handling of a wide range and a large variety of network traffic, as is typical in large-scale computer networks, including video and multimedia traffic. The amount of buffer resources and bandwidth resources assigned to each flow can be individually controlled by network management. In the dynamic operation of the network, these resources can be varied—based on actual network traffic loading and congestion encountered. The invention also teaches an enhanced datagram packet switched computer network which can selectively control flows of datagram packets entering the network and traveling between network nodes. This new network access control method also interoperates with existing media access control protocols, such as used in the Ethernet or 802.3 local area network. An aspect of the invention is that it does not require any changes to existing network protocols or network applications.

16 Claims, 6 Drawing Sheets

U.S. PATENT DOCUMENTS

| | | | |
|---|---|---|---|
| 4,424,565 A | 1/1984 | Larson | |
| 4,437,087 A | 3/1984 | Petr | |
| 4,438,511 A | 3/1984 | Baran | |
| 4,439,763 A | 3/1984 | Limb | |
| 4,445,213 A | 4/1984 | Baugh et al. | |
| 4,446,555 A | 5/1984 | Devault et al. | |
| 4,456,957 A | 6/1984 | Schieltz | |
| 4,464,658 A | 8/1984 | Thelen | |
| 4,499,576 A | 2/1985 | Fraser | |
| 4,506,358 A | 3/1985 | Montgomery | |
| 4,507,760 A | 3/1985 | Fraser | |
| 4,532,626 A | 7/1985 | Flores et al. | |
| 4,644,532 A | 2/1987 | George et al. | |
| 4,646,287 A | 2/1987 | Larson et al. | |
| 4,677,423 A | 6/1987 | Benvenuto et al. | |
| 4,679,189 A | 7/1987 | Olson et al. | 370/60 |
| 4,679,227 A | 7/1987 | Hughes-Hartogs | |
| 4,723,267 A | 2/1988 | Jones et al. | |
| 4,731,816 A | 3/1988 | Hughes-Hartogs | |
| 4,750,136 A | 6/1988 | Arpin et al. | |
| 4,757,495 A | 7/1988 | Decker et al. | |
| 4,763,191 A | 8/1988 | Gordon et al. | |
| 4,769,810 A | 9/1988 | Eckberg, Jr. et al. | |
| 4,769,811 A | 9/1988 | Eckberg, Jr. et al. | |
| 4,771,425 A | 9/1988 | Baran et al. | |
| 4,819,228 A | 4/1989 | Baran et al. | |
| 4,827,411 A | 5/1989 | Arrowood et al. | |
| 4,833,706 A | 5/1989 | Hughes-Hartogs | |
| 4,835,737 A | 5/1989 | Herrig et al. | |
| 4,879,551 A | 11/1989 | Georgiou et al. | |
| 4,893,306 A | 1/1990 | Chao et al. | |
| 4,903,261 A | 2/1990 | Baran et al. | |
| 4,922,486 A | 5/1990 | Lidinsky et al. | |
| 4,933,937 A | 6/1990 | Konishi | |
| 4,960,310 A | 10/1990 | Cushing | |
| 4,962,497 A | 10/1990 | Ferenc et al. | |
| 4,962,532 A | 10/1990 | Kasirai et al. | |
| 4,965,772 A | 10/1990 | Daniel et al. | |
| 4,970,678 A | 11/1990 | Sladowski et al. | |
| 4,979,118 A | 12/1990 | Kheradpir | 364/436 |
| 4,980,897 A | 12/1990 | Decker et al. | |
| 4,991,169 A | 2/1991 | Davis et al. | |
| 5,003,595 A | 3/1991 | Collins et al. | |
| 5,014,265 A * | 5/1991 | Hahne et al. | 370/236 |
| 5,020,058 A | 5/1991 | Holden et al. | |
| 5,033,076 A | 7/1991 | Jones et al. | |
| 5,054,034 A | 10/1991 | Hughes-Hartogs | |
| 5,059,925 A | 10/1991 | Weisbloom | |
| 5,072,449 A | 12/1991 | Enns et al. | |
| 5,088,032 A | 2/1992 | Bosack | |
| 5,095,480 A | 3/1992 | Fenner | 370/94.1 |
| 5,115,431 A | 5/1992 | Williams et al. | |
| 5,128,945 A | 7/1992 | Enns et al. | |
| 5,136,580 A | 8/1992 | Videlock et al. | |
| 5,153,877 A | 10/1992 | Esaki et al. | 370/389 |
| 5,166,930 A | 11/1992 | Braff et al. | |
| 5,199,049 A | 3/1993 | Wilson | |
| 5,206,886 A | 4/1993 | Bingham | |
| 5,208,811 A | 5/1993 | Kashio et al. | |
| 5,212,686 A | 5/1993 | Joy et al. | |
| 5,224,099 A | 6/1993 | Corbalis et al. | |
| 5,226,120 A | 7/1993 | Brown et al. | |
| 5,228,062 A | 7/1993 | Bingham | |
| 5,229,994 A | 7/1993 | Balzano et al. | |
| 5,237,564 A | 8/1993 | Lespagnol et al. | |
| 5,241,682 A | 8/1993 | Bryant et al. | |
| 5,243,342 A | 9/1993 | Kattemalalavadi et al. | |
| 5,243,596 A | 9/1993 | Port et al. | |
| 5,245,614 A | 9/1993 | Gutman et al. | |
| 5,247,516 A | 9/1993 | Bernstein et al. | |
| 5,249,178 A | 9/1993 | Kurano et al. | |
| 5,249,292 A | 9/1993 | Chiappa | |
| 5,253,251 A | 10/1993 | Aramaki | |
| 5,255,291 A | 10/1993 | Holden et al. | |
| 5,260,933 A | 11/1993 | Rouse | |
| 5,260,978 A | 11/1993 | Fleischer et al. | |
| 5,268,592 A | 12/1993 | Bellamy et al. | |
| 5,268,900 A | 12/1993 | Hluchyj et al. | |
| 5,271,004 A | 12/1993 | Proctor et al. | |
| 5,274,631 A | 12/1993 | Bhardwaj | |
| 5,274,635 A | 12/1993 | Rahman et al. | |
| 5,274,643 A | 12/1993 | Fisk | |
| 5,280,470 A | 1/1994 | Buhrke et al. | |
| 5,280,480 A | 1/1994 | Pitt et al. | 370/256 |
| 5,280,500 A | 1/1994 | Mazzola et al. | |
| 5,283,783 A | 2/1994 | Nguyen et al. | |
| 5,287,103 A | 2/1994 | Kasprzyk et al. | |
| 5,287,453 A | 2/1994 | Roberts | 395/200 |
| 5,287,535 A | 2/1994 | Sakagawa et al. | 370/60 |
| 5,291,442 A | 3/1994 | Emma et al. | 711/120 |
| 5,291,482 A | 3/1994 | McHarg et al. | |
| 5,305,311 A * | 4/1994 | Lyles | 370/390 |
| 5,307,343 A | 4/1994 | Bostica et al. | |
| 5,309,437 A | 5/1994 | Perlman et al. | 370/85.13 |
| 5,311,509 A | 5/1994 | Heddes et al. | |
| 5,313,454 A | 5/1994 | Bustini et al. | |
| 5,313,582 A | 5/1994 | Hendel et al. | |
| 5,317,562 A | 5/1994 | Nardin et al. | |
| 5,319,644 A | 6/1994 | Liang | |
| 5,325,504 A | 6/1994 | Tipley et al. | 711/128 |
| 5,327,421 A | 7/1994 | Hiller et al. | |
| 5,331,637 A | 7/1994 | Francis et al. | |
| 5,335,224 A | 8/1994 | Cole et al. | 370/235 |
| 5,345,445 A | 9/1994 | Hiller et al. | |
| 5,345,446 A | 9/1994 | Hiller et al. | |
| 5,347,642 A | 9/1994 | Barratt | 711/113 |
| 5,359,592 A | 10/1994 | Corbalis et al. | |
| 5,361,250 A | 11/1994 | Nguyen et al. | |
| 5,361,256 A | 11/1994 | Doeringer et al. | |
| 5,361,259 A | 11/1994 | Hunt et al. | |
| 5,365,524 A | 11/1994 | Hiller et al. | |
| 5,367,517 A | 11/1994 | Cidon et al. | |
| 5,371,852 A | 12/1994 | Attanasio et al. | |
| 5,386,567 A | 1/1995 | Lien et al. | |
| 5,390,170 A | 2/1995 | Sawant et al. | |
| 5,390,175 A | 2/1995 | Hiller et al. | |
| 5,392,280 A * | 2/1995 | Zheng | 370/353 |
| 5,394,394 A | 2/1995 | Crowther et al. | |
| 5,394,402 A | 2/1995 | Ross | |
| 5,394,408 A | 2/1995 | Nishihara et al. | 714/812 |
| 5,400,325 A | 3/1995 | Chatwani et al. | |
| 5,408,469 A | 4/1995 | Opher et al. | |
| 5,416,842 A | 5/1995 | Aziz | |
| 5,418,922 A | 5/1995 | Liu | 711/3 |
| 5,420,858 A * | 5/1995 | Marshall et al. | 370/352 |
| 5,422,880 A | 6/1995 | Heitkamp et al. | |
| 5,422,882 A | 6/1995 | Hiller et al. | |
| 5,423,002 A | 6/1995 | Hart | |
| 5,426,636 A | 6/1995 | Hiller et al. | |
| 5,426,637 A | 6/1995 | Derby et al. | 370/401 |
| 5,428,607 A | 6/1995 | Hiller et al. | |
| 5,430,715 A | 7/1995 | Corbalis et al. | |
| 5,430,729 A | 7/1995 | Rahnema | |
| 5,432,784 A | 7/1995 | Ozveren | 370/235 |
| 5,442,457 A | 8/1995 | Najafi | |
| 5,442,624 A | 8/1995 | Bonomi et al. | 370/231 |
| 5,442,630 A | 8/1995 | Gagliardi et al. | |
| 5,444,491 A | 8/1995 | Lim | 348/441 |
| 5,450,406 A | 9/1995 | Esaki et al. | 370/60 |
| 5,452,297 A | 9/1995 | Hiller et al. | |
| 5,473,599 A | 12/1995 | Li et al. | |
| 5,473,607 A | 12/1995 | Hausman et al. | |
| 5,477,541 A | 12/1995 | White et al. | |
| 5,483,640 A | 1/1996 | Isfeld et al. | 395/200.03 |
| 5,485,455 A | 1/1996 | Dobbins et al. | |
| 5,490,140 A | 2/1996 | Abensour et al. | |
| 5,490,258 A | 2/1996 | Fenner | 395/401 |
| 5,491,687 A | 2/1996 | Christensen et al. | |
| 5,491,804 A | 2/1996 | Heath et al. | |
| 5,497,368 A | 3/1996 | Reijnierse et al. | |
| 5,499,238 A | 3/1996 | Shon | 370/399 |
| 5,504,747 A | 4/1996 | Sweasey | |
| 5,509,006 A | 4/1996 | Wilford et al. | |
| 5,517,494 A | 5/1996 | Green | |
| 5,519,704 A | 5/1996 | Farinacci et al. | |
| 5,519,858 A | 5/1996 | Walton et al. | 395/600 |
| 5,523,999 A | 6/1996 | Takano et al. | 370/389 |

| | | | |
|---|---|---|---|
| 5,526,489 A | 6/1996 | Nilakantan et al. | |
| 5,528,592 A | 6/1996 | Schibler et al. | 370/397 |
| 5,530,963 A | 6/1996 | Moore et al. | |
| 5,533,033 A | 7/1996 | Ratner | 714/746 |
| 5,535,195 A | 7/1996 | Lee | |
| 5,539,734 A | 7/1996 | Burwell et al. | |
| 5,541,911 A | 7/1996 | Nilakantan et al. | |
| 5,546,370 A | 8/1996 | Ishikawa | |
| 5,555,244 A | 9/1996 | Gupta et al. | |
| 5,557,747 A | 9/1996 | Rogers et al. | 709/223 |
| 5,561,669 A | 10/1996 | Lenney et al. | |
| 5,566,170 A | 10/1996 | Bakkee et al. | 370/392 |
| 5,583,862 A | 12/1996 | Callon | |
| 5,583,865 A | 12/1996 | Esaki et al. | 370/397 |
| 5,592,470 A | 1/1997 | Rudrapatna et al. | |
| 5,598,581 A | 1/1997 | Daines et al. | |
| 5,600,798 A | 2/1997 | Cherukuri et al. | |
| 5,604,868 A | 2/1997 | Komine et al. | |
| 5,608,726 A | 3/1997 | Virgile | |
| 5,608,908 A | 3/1997 | Barghouti et al. | 395/703 |
| 5,610,904 A | 3/1997 | Eng et al. | 370/408 |
| 5,614,891 A | 3/1997 | Zeinstra et al. | 340/825.22 |
| 5,617,417 A | 4/1997 | Sathe et al. | |
| 5,617,421 A | 4/1997 | Chin et al. | |
| 5,625,622 A | 4/1997 | Johri | 370/232 |
| 5,627,821 A * | 5/1997 | Miyagi | 370/242 |
| 5,630,125 A | 5/1997 | Zellweger | 395/614 |
| 5,632,021 A | 5/1997 | Jennings et al. | |
| 5,634,010 A | 5/1997 | Ciscon et al. | |
| 5,638,359 A | 6/1997 | Peltola et al. | |
| 5,640,389 A * | 6/1997 | Masaki et al. | 370/418 |
| 5,644,718 A | 7/1997 | Belove et al. | |
| 5,644,751 A | 7/1997 | Burnett | 711/113 |
| 5,659,684 A | 8/1997 | Giovannoni et al. | |
| 5,666,353 A | 9/1997 | Klausmeier et al. | |
| 5,673,265 A | 9/1997 | Gupta et al. | |
| 5,675,742 A * | 10/1997 | Jain et al. | 709/226 |
| 5,678,006 A | 10/1997 | Valizadeh et al. | |
| 5,680,116 A | 10/1997 | Hashimoto et al. | |
| 5,684,797 A | 11/1997 | Aznar et al. | 370/390 |
| 5,689,506 A | 11/1997 | Chiussi et al. | 370/388 |
| 5,694,390 A | 12/1997 | Yamato et al. | |
| 5,699,532 A | 12/1997 | Barrett et al. | 710/129 |
| 5,748,186 A | 5/1998 | Raman | 345/302 |
| 5,748,617 A | 5/1998 | McLain, Jr. | |
| 5,754,768 A | 5/1998 | Brech et al. | 395/200.6 |
| 5,757,771 A * | 5/1998 | Li et al. | 370/235 |
| 5,802,054 A | 9/1998 | Bellenger | |
| 5,835,710 A | 11/1998 | Nagami et al. | |
| 5,842,040 A | 11/1998 | Hughes et al. | 710/11 |
| 5,856,981 A | 1/1999 | Voelker | |
| 5,862,083 A | 1/1999 | Tobita et al. | 365/185.09 |
| 5,892,924 A | 4/1999 | Lyon et al. | 395/200.75 |
| 5,903,559 A | 5/1999 | Acharya et al. | |
| 6,091,725 A | 7/2000 | Cheriton et al. | 370/392 |
| 6,343,322 B2 | 1/2002 | Nagami et al. | 709/227 |
| 6,590,894 B1 | 7/2003 | Kerr et al. | 370/392 |
| 2001/0051865 A1 | 12/2001 | Kerr et al. | 703/27 |

FOREIGN PATENT DOCUMENTS

| | | |
|---|---|---|
| EP | 0431751 A1 | 11/1990 |
| EP | 0567217 A2 | 10/1993 |
| WO | WO93/07569 | 4/1993 |
| WO | WO93/07692 | 4/1993 |
| WO | WO94/01828 | 1/1994 |
| WO | WO95/20850 | 8/1995 |

OTHER PUBLICATIONS

Allen, M., "Novell IPX Over Various WAN Media (IPXWAN-)," Network Working Group, RFC 1551, Dec. 1993, pp. 1-22.

Chowdhury, et al., "Alternative Bandwidth Allocation Algorithms for Packet Video in ATM Networks," INFOCOM 1992, pp. 1061-1068.

Doeringer, W., "Routing on Longest-Matching Prefixes," IEEE/ACM Transactions in Networking, vol. 4, No. 1, Feb. 1996, pp. 86-97.

Esaki, et al., "Datagram Delivery in an ATM-Internet," 2334b IEICE Transactions on Communications, Mar. 1994, No. 3, Tokyo, Japan.

IBM Corporation, "Method and Apparatus for the Statistical Multiplexing of Voice, Data and Image Signals," IBM Technical Disclosure Bulletin, No. 6, Nov. 1992, pp. 409-411.

Pei, et al., "Putting Routing Tables in Silicon," IEEE Network Magazine, Jan. 1992, pp. 42-50.

Perkins, D., "Requirements for an Internet Standard Point-to-Point Protocol," Network Working Group, RFC 1547, Dec. 1993, pp. 1-19.

Simpson, W., "The Point-to-Point Protocol (PPP)," Network Working Group, RFC 1548, Dec. 1993, pp. 1-53.

Tsuchiya, P.F., "A Search Algorithm for Table Entries with Non-Contiguous Wildcarding," Abstract, Bellcore.

Zhang, et al., "Rate-Controlled Static-Priority Queueing," INFOCOM 1993, pp. 227-236.

Chowdhury, et al. "Alternative Bandwith Allocation," 1992, IEEE Infocom '92, pp. 1061-1068.

Zhang, et al. "Rate-Controlled Static-Priority Queueing," 1993, IEEE, pp. 227-236.

IBM, "Method and Apparatus for the Statistical Multiplexing of Voice, Data, and Image Signals", Nov. 1992, IBM Technical Data Bulletin n6 Nov. 1992, pp. 409-411.

Esaki, et al., "Datagram Delivery in an ATM-Internet," IEICE Transactions on Communications vol. E77-B, No. 3, Mar. 1994, Tokyo, Japan.

Doeringer, et al., "Routing on Longest-Matching Prefixes," IEEE Transactions on Networking, vol. 4, No. 1, Feb. 1996, pp. 86-97.

* cited by examiner

METHOD FOR TRAFFIC MANAGEMENT, TRAFFIC PRIORITIZATION, ACCESS CONTROL, AND PACKET FORWARDING IN A DATAGRAM COMPUTER NETWORK

CROSS REFERENCE TO RELATED APPLICATIONS

This application is a continuation of U.S. patent application Ser. No. 10/725,968 filed Dec. 2, 2003, now U.S. Pat. No. 7,443,858 issued Oct. 28, 2008, which is incorporated herein by reference and a continuation of U.S. patent application Ser. No. 09/482,940 filed Jan. 14, 2000, now U.S. Pat. No. 6,798,776 issued Sep. 28, 2004, which is incorporated herein by reference and a continuation of U.S. patent application Ser. No. 08/581,134 filed Dec. 29, 1995, now U.S. Pat. No. 6,091,725 issued Jul. 18, 2000, which is incorporated herein by reference.

TECHNICAL FIELD OF THE INVENTION

The present invention relates to the field of computer networks. More particularly, the present invention relates to the field of computer networks which are based on datagram packet switching.

BACKGROUND OF THE INVENTION

Computer Networks are used to interconnect computers and peripherals to allow them to exchange and share data such as files, electronic mail, databases, multimedia/video, and other data.

Packet Switching

Nearly all computer networks use packet switching, which divides longer units of data transfer into smaller packets which are sent separately over the network. This allows each packet to be processed independently from another packet without having to wait for the entire data transfer to be completed. It also enables communications between a plurality of computer systems to be intermixed on one network. Host interfaces connect the computer systems to a network allowing each computer system to act as the source and destination of packets on the network.

A first key issue in packet switched networks is addressing. The addressing in packet switched networks is conventionally performed by one of two approaches, known as virtual circuit packet switching or datagram, packet switching.

Virtual Circuit Packet Switching

In the virtual circuit approach, before any data can be transmitted, a virtual circuit must be first established along the path from the source to the destination in advance of any communication. After the virtual circuit is setup, the source can then send packets to the destination. Each packet in the virtual circuit approach has a virtual circuit identifier, which is used to switch the packet along the path from source to the destination.

The virtual circuit approach reduces the size of the identification required in each packet header. It also allows additional information about the packet handling to be established as part of the virtual circuit setup operation. Another claimed benefit is that forwarding and switching of virtual circuit packets can be made more efficient because of the virtual setup process. However, the virtual circuit approach incurs the cost of delay to setup the virtual circuit before sending any data, and it incurs the cost of maintaining the virtual circuit state in each network device along the virtual circuit path, even if a virtual circuit is idle. Also, in practice the memory space for virtual circuit state in network devices has limited the number of circuits that are available, which complicates the behavior of network nodes that need to create virtual circuits to communicate.

Datagram Packet Switching

In the datagram approach, each datagram packet is a self-contained unit of data delivery. A typical datagram packet includes a globally unique source address, a globally unique destination address, a protocol type field, a data field, and a cyclic redundancy checksum ("CRC") to insure data integrity.

Datagrams can be sent without prior arrangement with the network, i.e. without setting up a virtual circuit or connection. Each network device receiving a datagram packet examines the destination address included in the datagram packet and makes a local decision whether to accept, ignore, or forward this packet.

Various conventional network devices learn information from observing datagram packet traffic in data networks. For example, a conventional network switch device that interconnects multiple network segments can "learn" the location of network stations connected to its ports by monitoring the source address of packets received on its ports. After it has associated a station address with a certain port, the network switch can then forward datagram packets addressed to that station to that port. In this type of device, the datagram source address is used to learn the location of a station on the network, whereas the forwarding decision is made on basis of the datagram destination address alone.

Datagram packet switching has the advantage that it avoids the overhead and cost of setting up virtual circuit connection in network devices. However, it incurs the expense of transmitting a larger packet header than required for virtual circuit switching, and it incurs the cost for processing this larger packet header in every network device to which it is delivered. Also, there is no virtual circuit setup process to establish additional information for datagram packet processing. Another disadvantage of datagram packet switching is that it is difficult to control packet flow to the same degree as with virtual circuits because there is, in the conventional case, no state in the network devices associated with the traffic flow.

The datagram packet switching approach has been extensively used in shared media local area networks. Shared media networks provide for a multiplicity of stations directly connected to the network, with the shared media providing direct access from any transmitter to any receiver. Since the receivers need to be able to distinguish packets addressed specifically to them, each receiver needs to have a unique address. In addition, since the unit of access to the shared medium is one packet, each packet needs to contain the unique address capable to identify the receiver. As a result, all commonly used local area networks are based on datagram packet switching and have no provisions for virtual circuit setup.

Media Access Control Protocol

The network access mechanism in shared media local area network will now be further described. This function, commonly known as the media access control or MAC protocol, defines how to arbitrate access among multiple stations that desire to use the network. Individual stations connected to the network have to adhere to the MAC protocol in order to allow proper network operation.

A number of different media access control protocols exist. The MAC protocol, in conjunction with the exact packet format, is the essence of what defines a local area network standard. The following is a brief overview of local area network standards that are in wide use today.

The most widely used local area network is commonly known as Ethernet and employs an access protocol referred to as Carrier Sense Multiple Access with collision Detection (CSMA/CD). [see U.S. Pat. No. 4,063,220, issued Dec. 13, 1977, for a Multipoint Data Communication System with Collision Detection, Inventors Metcalfe, Boggs, Thacker, and Lampson]. The current definition of the Ethernet CSMA/CD protocol is defined in IEEE Standard 802.3, published by the Institute of Electrical and Electronics Engineers, 345 East 45th Street, New York, N.Y. 10017. The Ethernet standard specifies a data transmission rate of 10 or 100 Megabits/second.

Another widely used local area network standard is Token-ring, also known as IEEE Std 802.5, transmitting at a speed of 4 or 16 Mbits/sec and FDDI or Fiber-Distributed-Data-Interface which sends data at a speed of 100 Mbits/sec. Both Tokenring and FDDI are based on a circulating token granting access to the network, although their respective datagram packet formats and other operating aspects are unique to each standard.

What is common to all these media access control mechanisms is that they do not include provisions for virtual circuit setup and have no provisions to specify attributes that relate to virtual circuits, such as traffic management or flow control for specific connections. This limits the ability of conventional local area networks to accommodate higher level network functions or to support virtual connection oriented traffic mechanisms.

Devices for Interconnecting Local Area Networks

Another key issue with datagram packet switched networks is how to interconnect individual network segments into larger networks. The size and usage of datagram packet switched networks has grown much beyond what was envisioned when these networks were designed. Devices such as bridges, switches, and routers, have been used to interconnect individual LAN segments into larger networks, but each have their own set of problems in scaling to higher performance.

Bridges forward datagram packets between network segments by learning the location of the devices on the network by observing the source address contained in datagram packets passing by. Once the bridge has learned which network device is located on which network segment, it can then forward datagram packets addressed to that network device to the appropriate network segment. One of the limitations of bridges is that they do not filter traffic beyond the data link level.

Switches are basically multi-port network bridges that can forward datagram packets among a multiplicity of network ports. Frequently, switches provide additional capabilities for assisting with network management, including traffic filtering and segmenting networks into virtual LANs. As in the case of bridges, switches have to forward broadcasts to all ports configured into one virtual LAN. In addition, conventional switches cannot provide fair service or priority service to individual traffic flows, and they require significant amount of memory to avoid dropping packets in the case of network congestion.

Routers also interconnect several network segments, but they operate primarily at the network protocol layer, rather than at the datagram packet layer. Routers participate in all network protocol functions, which traditionally requires general purpose processing. As a result, traditional routers are more expensive and have less throughput than switches. In addition they are more difficult to administer.

Finally, virtual circuit packet switched networks, in particular ATM, have been proposed to interconnect local area network segments. However, it has turned out to be very difficult to map existing network protocols that are based on datagram packets to the ATM network architecture.

In summary, bridges and switches transparently extend the domain of networks, and allow for cost-effective and high-performance implementations. However, they cannot segment a network effectively in terms of traffic management and broadcast traffic. Routers, on the other hand, can segment networks very effectively, but are much more expensive and are performance bottleneck in high-speed networks. ATM has been very difficult to map to current network protocols.

The ideal network device for interconnecting network segments would have the high-speed and cost-effectiveness of a switch, with the ability of segment and manage network traffic similar to a router.

Traffic Management

Another key issue in packet switched networks is traffic control or traffic management.

In a packet switched network, each link at every switching node in the network represents a queue. As the traffic arrival rate at a link approaches its transmission rate, the queue length grows dramatically and the data in the queue needs to be stored in the attached network nodes. Eventually, a network node will run out of packet buffer capacity which will cause further packets arriving to be discarded or dropped. Dropped packets are eventually retransmitted by the source, causing the traffic load to increase further. Eventually, the network can reach a state where most of the packets in the network are retransmissions.

Conventionally, two types of traffic control mechanism are used in packet switched networks: flow control and congestion control. Flow control is concerned with matching the transmission rate of a source station to the reception rate of a destination station. A typical networks flow control mechanism uses a window techniques to limit the number of packets a source can transmit which are not yet confirmed as having been received by the destination. Conventional flow control is an end-to-end mechanism that exists in certain network protocols, in particular connection oriented network protocols such as TCP/IP. However, conventional flow control between source and destination does not solve the network congestion problem, since it does not take the utilization of buffer resources within the network into account. In addition, non-connection oriented network protocols do not use window based flow control. Also, continuous rate traffic sources such as real-time video don't match the nature of destination controlled behavior since the transmission rate is determined by the source.

Problem Statement

What is needed is an improved method and apparatus for high-speed datagram packet switched networks that can support a large number of network stations, a wide range of network transmission speeds, a wide variety of source traffic behavior including video and multimedia, while maintaining compatibility with existing network protocols and applications.

SUMMARY OF THE INVENTION

Methods and apparatus for an enhanced datagram packet switched computer network are disclosed.

The invention processes network datagram packets in network devices as separate flows, based on the source-destination address pair contained in the datagram packet itself. As a result, the network can control and manage each flow of datagrams in a segregated fashion. The processing steps that can be specified for each flow include traffic management, flow control, packet forwarding, access control, and other network management functions.

The ability to control network traffic on a per flow basis allows for the efficient handling of a wide range and a large variety of network traffic, as is typical in large-scale computer networks, including video and multimedia type traffic.

The amount of buffer resources and bandwidth resources assigned to each flow can be individually controlled by network management. In the dynamic operation of the network, these resources can be varied based on actual network traffic loading and congestion encountered.

The invention also includes an enhanced network access control method which can selectively control flows of datagram packets entering the network and traveling between network nodes. This new network access control method interoperates with existing media access control protocols, such as used in the Ethernet or 802.3 local area network.

An important aspect of the invention is that it can be implemented in network switching devices at very high performance and at low cost. High performance is required to match the transmission speed of datagram packets on the network. Low cost is essential such that it is economical to use the invention widely.

In the preferred implementation, both high-performance and low cost is achieved by partitioning the task of datagram flow processing between dedicated network switch hardware and dedicated network switch software that executes on a high-speed controller CPU.

The network switch hardware provides a multiplicity of network ports, a shared memory buffer for storing datagram packets, a virtual path cache that stores the state and processing instructions specific to the active datagram packet flows.

Datagram packets received on an input port are buffered in the shared memory buffer. The source-destination address pair in the datagram packet header is used to index the virtual path cache to find a matching entry. If a matching entry is found in the virtual path cache, then the switch hardware performs all the packet processing steps indicated in the virtual path record, including traffic management and packet routing.

If no matching entry is found in the virtual path cache, then the datagram packet is forwarded to the controller CPU for general purpose processing. The controller CPU determines, through network management data structures and software, how to process further datagram packets with this source-destination address in the switch hardware. The controller CPU then loads an appropriate entry into the virtual path cache. If all entries in the virtual path cache are in use, then the CPU removes the least recently used entry before loading the new entry.

BRIEF DESCRIPTION OF THE DRAWINGS

Other features and advantages of the present invention will become more apparent to those skilled in the art from the following detailed description in conjunction with the appended drawings in which.

DETAILED DESCRIPTION OF THE INVENTION

An enhanced computer network communication system is disclosed.

To help understand the invention, the following definitions are used:

A "datagram packet" is a self-contained unit of packet delivery on a packet switched network, which includes a destination address field, a source address field, an optional type field, and a data field.

The "destination address" and the "source address" refer to the physical network device addresses contained in a datagram packet, both of which are unique within a network.

A "flow" is a plurality of datagram packets each packet containing an identical source-destination address pair.

A "virtual path" is the communication path from a source to a destination in a datagram packet switched network.

In the following description, for purposes of explanation, specific numbers, times, signals, and other parameters are set forth in order to provide a thorough understanding of the present invention. However, it will be apparent to anyone skilled in the art that the present invention may be practiced without these specific details. In other instances, well known circuits and devices are shown in block diagram in order not to obscure the present invention unnecessarily.

Figure 1:
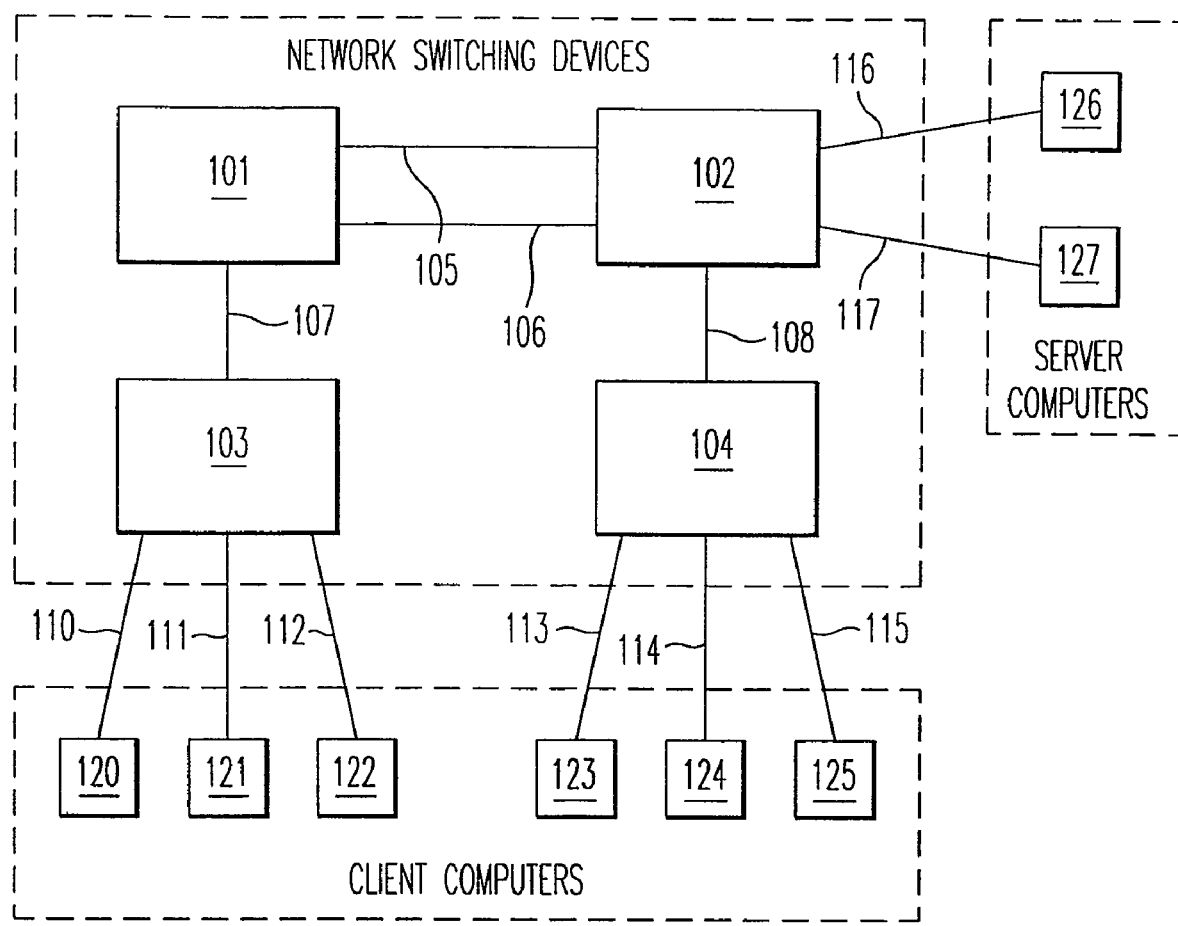
FIG. 1 is a block diagram of a computer communication system.

The datagram packet switched communication system is illustrated in FIG. 1 by way of four network switching devices 101, 102, 103, and 104 interconnected with each other via backbone links 105, 106, 107, and 108. In addition, switch 103 is interconnected via links 110 through 112 to client computers 120 through 122, switch 104 is interconnected via links 113 through 115 to client computers 123 to 125 and switch 102 is interconnected via links 116 and 117 to server computers 126 and 127.

The network shown in FIG. 1 is small for purposes of illustration. In practice most networks would include a much larger number of host computers and network switching devices.

The basic unit of transmission and processing in this network is a datagram. For purposes of illustration, we will be using the Ethernet datagram packet format in this description. It will be apparent to anyone skilled in the art that other datagram packet formats can also be used to practice this invention, including the different datagrams described in the IEEE 802 family of network standards.

Figure 2:
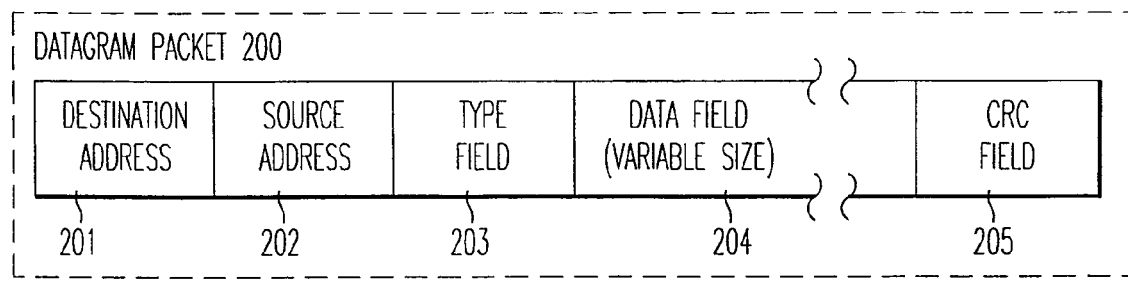
FIG. 2 is a block diagram of the Ethernet datagram packet format.

As illustrated in FIG. 2, the Ethernet datagram 200 contains a 48-bit destination address field 201, a 48-bit source address field 202, a 16-bit type field 203, a variable size data field 204 ranging from 46 bytes to 1500 bytes, and a 32-bit CRC field 205.

A key aspect of the present invention is the virtual path method. A virtual path is specified by the source-destination address pair contained in a datagram packet. In the Ethernet packet datagram, the source-destination address pair can be thought of as a 96-bit circuit identifier, which specifies a unidirectional circuit from the source to the destination. This 96-bit circuit identifier will subsequently be referred to as a virtual path in order to avoid confusion with virtual circuit networks. While this 96-bit virtual path identifier may appear large as compared to the much smaller circuit identifiers in virtual circuit networks, it has the significant advantage that it is globally unique and thus does not require to be mapped to different identifiers as a datagram packet travels along the path from source to destination.

Virtual Path Record

Each datagram packet arriving at a network switching device is recognized as traveling on a particular virtual path by the source-destination address pair contained in this header. The network switch maps this source-destination pair to a virtual path record in the switch. The virtual path record specifies how the datagram packet is to be processed, including its routing, priority, scheduling and buffer resource allocation.

Figure 3:
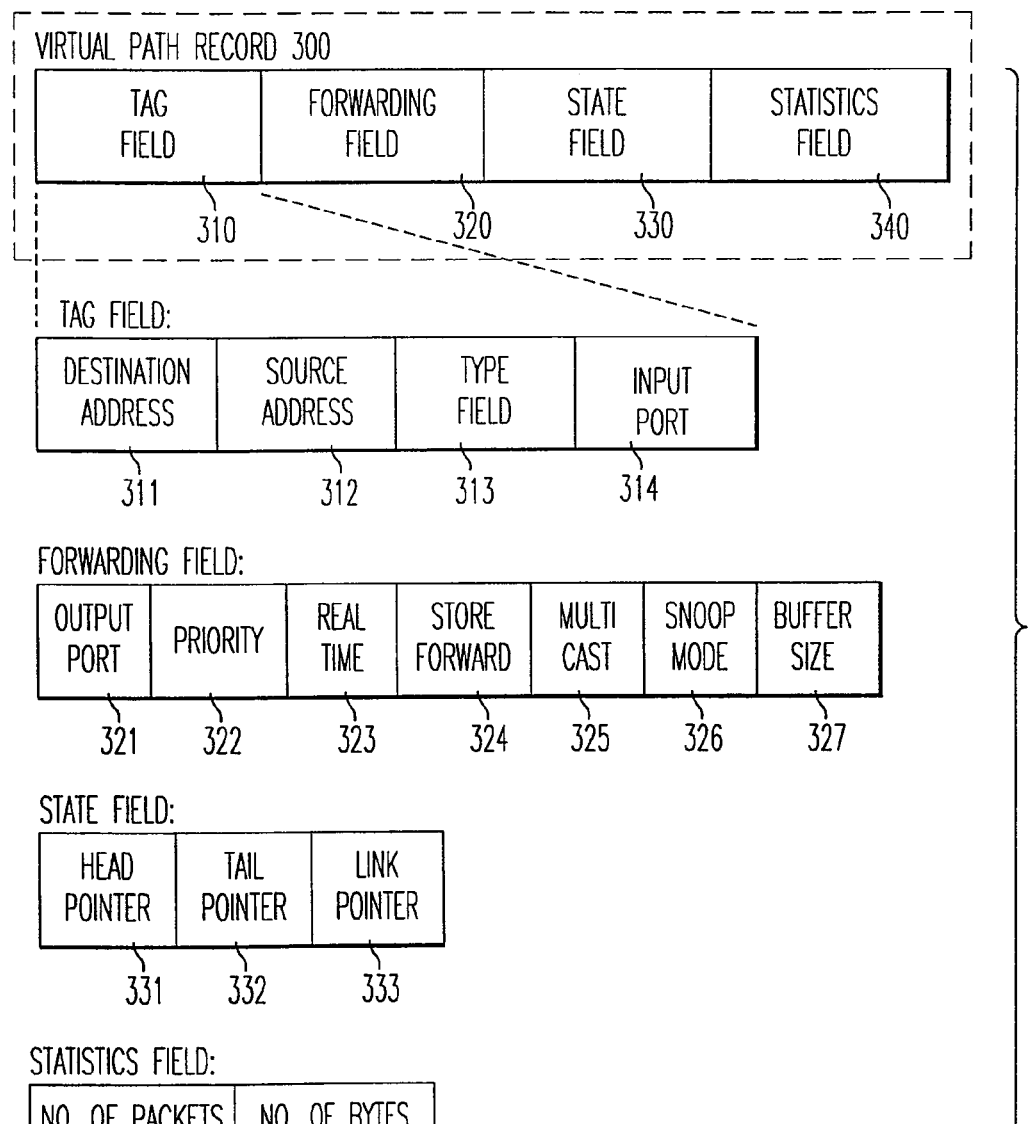
FIG. 3 illustrates the Virtual Path Record data structure.

FIG. 3 illustrates the data structure of the virtual path record.

It will be apparent to those skilled in the art that other data structures from the one shown can be successfully used, including but not limited to fields of different size, arranging the fields in different order, and additional fields not present in FIG. 3.

Turning now to the specific virtual path record illustrated in FIG. 3, there are four groups of fields: the tag field 310, the forwarding field 320, the state field 330, and the statistics field 340. The function and meaning of these fields will now be described.

Tag Field

The purpose of the tag field is to match an incoming datagram packet against a virtual path record. The tag field 310 has four subfields: the destination address field 311, the source address field 312, the optional type field 313, and the input port field 314.

Since the virtual path index is quite large, 96 bits in the case of Ethernet datagrams, it is not practical to provide a full array indexed by the virtual path number. Instead, each virtual path record is keyed with the virtual path number to allow lookup by search or partial index. One method for organizing the virtual path records and looking them up will be further described below.

For the lookup method to locate the correct virtual path record, the destination address field 311 and the source address field 312 in the virtual path record must match the destination address field 201 and the source address field 202 in the datagram header.

Type field 313 allows for optional type filtering. If the type field is set to 0, any type field 203 in the datagram header will match this virtual path record. However, if the type field is not 0, then the type field has to match the type field 203 in the datagram header exactly for the match to be successful.

The input port field 314 allows input port filtering. The input port field has to match the actual input port number at which the datagram packet has been received.

Forwarding Field

The forwarding field 320 determines how the datagram packet should Le forwarded. Output port field 321 specifies the output port on which this datagram will be transmitted. Priority field 322 specifies the traffic management priority of this virtual path compared to other virtual paths. Real time field 323 forces the switch to process this packet in real time mode, which includes the act of dropping the packet if it cannot be sent within a certain time.

Store Forward field 324 selects the store-forward mode of operation. Normally the switch operates in cut-through mode where an incoming datagram is sent on to the output port as soon as feasible, even before it is completely received. In store-forward mode, an incoming packet must be completely received before it is sent on. This is a requirement in case of speed conversion from a slower input port to a faster output port. Store-forward mode is also used to insure the correctness of the complete packet received before sending it on.

Multicast field 325 selects the multicast mode of operation. Multicast mode involves scheduling of a single datagram packet on multiple outputs, which are determined by a bit vector in the output port field, with "1" bits indicating output ports to which the Multicast should be sent.

Field 326 is the Snoop Mode. Snoop mode when selected sends a copy of the datagram packet to the CPU for general purpose processing.

Field 327 is the Buffer Size field, which specifies the maximum number of packet buffers allocated to this path for buffering purposes.

The state field 330, includes the following fields: Head Pointer Field 331, which points to the beginning of the buffer area associated with this virtual path; Tail Pointer 332 points to the end of the buffer area of this virtual path; Uplink Pointer 333 points to the next virtual path record to transmit to the source, downlink pointer 334 points to the next virtual path record to transmit to the destination.

The statistics field 340 maintains traffic statistics regarding the traffic received on this virtual path. Field 341 counts the number of packets received and field 342 counts the number of bytes received on this virtual path.

Figure 4:
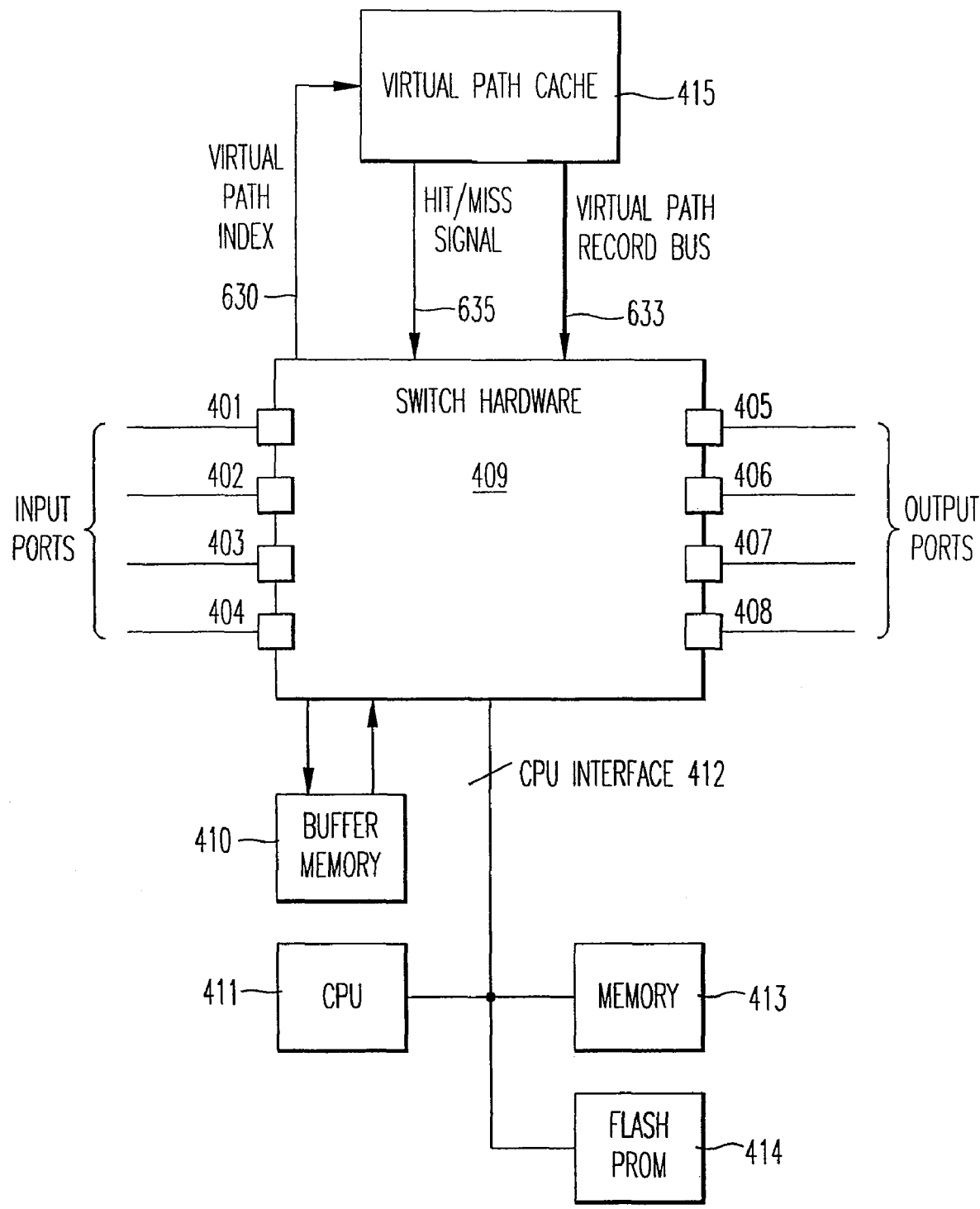
FIG. 4 is a block diagram of the network switching device.

FIG. 4 Preferred Implementation

Referring to FIG. 4, a virtual path network switching device 400 is illustrated with Network Input Ports 401 through 404, network output ports 405 through 408, switch hardware 409, where shared buffer memory 410, controller CPU 411, CPU interface 412, CPU read-and-write memory 413, Flash PROM 414, and virtual path cache 415. Using FIG. 4 and the flow chart in FIG. 5, a cycle of operation will be described.

Datagram packets arriving through network ports 401 through 404 are temporarily stored in shared buffer memory 410. As soon as the datagram packet header has arrived, which in the case of Ethernet datagrams is after the first 14 bytes of the datagram packet, the virtual path cache is looked up to check whether a virtual path cache entry exists for this path. If a matching entry is found in the virtual path cache 415, then switch hardware 409 starts processing the datagram packet as specified in the virtual path cache entry which in the typical case will forward the datagram packet on one of the output ports 405 through 408.

If no entry matching the datagram was found in the virtual path cache 415, then the datagram packet is forwarded to controller CPU 411 via CPU interface 412 for general purpose processing. Controller CPU 411 processes datagram packet according to instructions and data stored in main memory 413 and optionally in Flash PROM 414. Said instructions and data structures used for datagram processing have been created previously by network management, network configuration, network statistics, and network behavior.

The result of the datagram general purpose processing is that the CPU determines how future datagram packets on this virtual path should be processed by the switch hardware 409 and loads an appropriate entry into the virtual path cache 415. If all entries in the virtual path cache 415 are in use, then controller CPU 409 removes the least recently used entry in virtual path cache 415 before loading the new entry. CPU 411 then forwards the datagram packet to the switch hardware 409 via CPU interface 412 for transmission.

When the controller CPU loads a new virtual path cache entry, it sets the tag field 310 to the desired virtual path index, the forwarding field 320 to the desired forwarding function, and it initializes the state field 330 and the statistics field 340. The switch hardware will then automatically update the state and the statistics fields as the path is used. The switch hardware does not modify the information in the tag field and the forwarding field.

Figure 5:
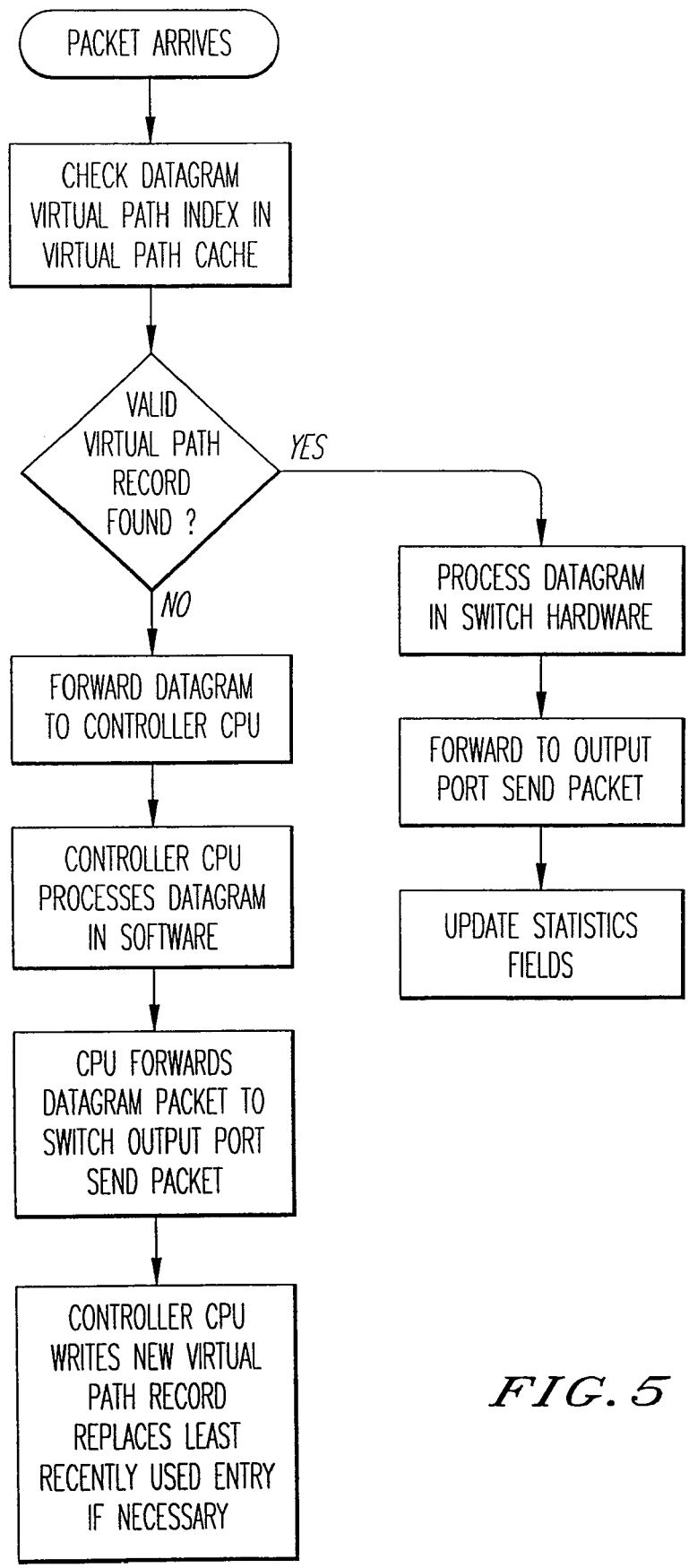
FIG. 5 is a flow diagram of the network switching device operation.

FIG. 5 Flow Diagram

A method in accordance with this invention is shown in the flow diagram of FIG. 5.

1. Packet Arrives at the invented system.
2. Check Datagram Virtual Path Index against Virtual Path Cache.
3. If valid virtual path entry is found, process packet in Switch Hardware which includes the steps of forwarding the datagram packet to output port and updating the statistics field 340.
4. If No Entry is found, forward packet to Controller CPU to process datagram packet in software. Controller CPU sends datagram packet back to switch hardware for transmission on the appropriate output port.
5. If Controller CPU determines that future datagram packets of this virtual path should be processed by switch hardware, Controller CPU then creates new virtual path record and writes it into virtual path cache, replacing the least recently used entry if necessary.

Virtual Path Cache Organization

Figure 6:
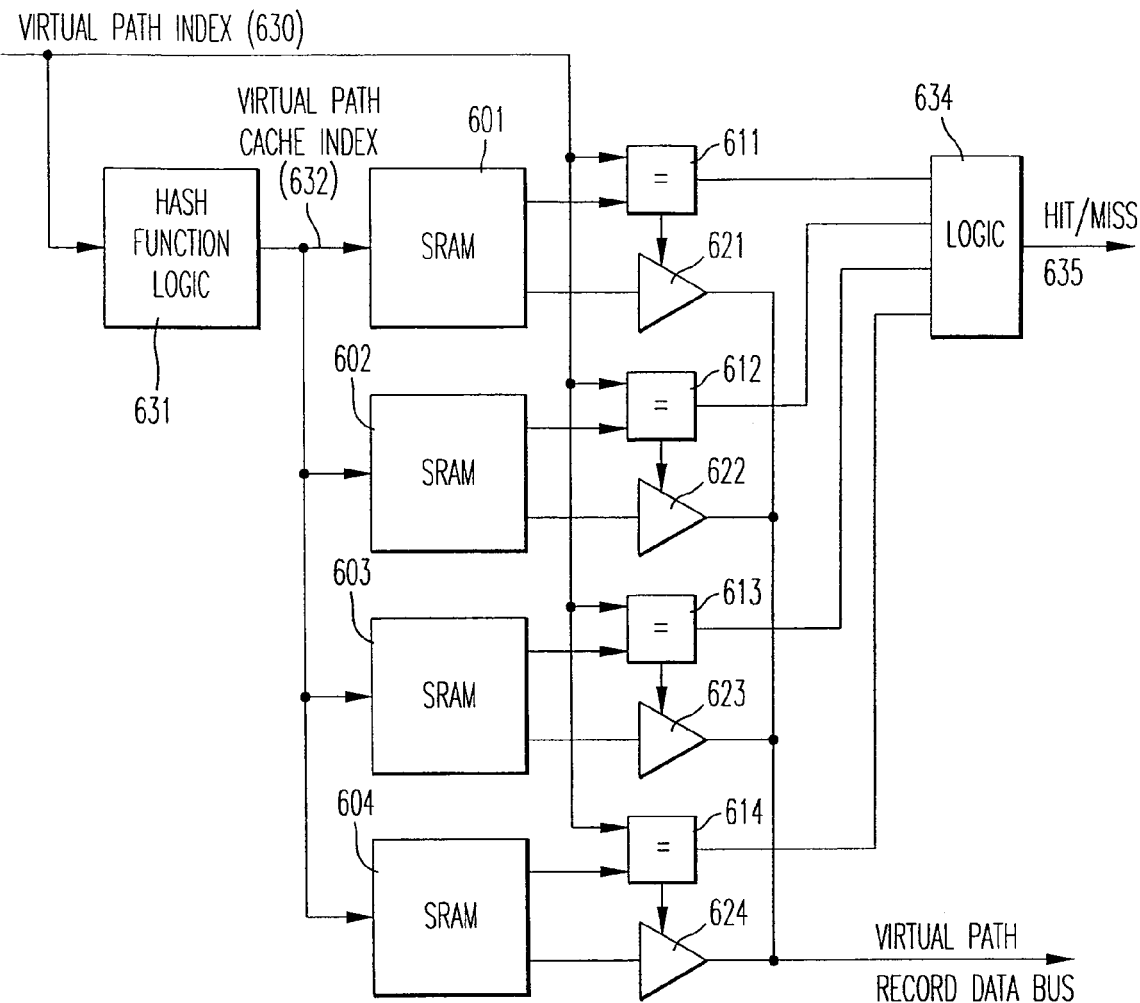
FIG. 6 is a block diagram of the virtual path cache.

FIG. 6 illustrates an example of virtual path cache organization.

It will be apparent to anyone skilled in the art that other cache sizes and organizations from the one shown can be successfully used, including but not limited to caches of different size, associativity, alternative hash-function, and content-addressability.

The virtual path cache illustrated in FIG. 6 is organized as a 4-set associative cache built with four banks of high-speed static memory 601 through 604, each equipped with a set of comparators 611 . . . 614 that control a set of tri-state buffers 621 through 624.

The virtual path index 630, which is the source-destination address pair of the incoming datagram, enters hash function 631 which in turn produces a virtual patch cache index 632 which in turn looks up the four parallel sets of the virtual path cache SRAMs 601 through 604. The tag field 310 from each set of SRAMs will be compared against the virtual path index 630 and only that virtual path record that matches will be output on the virtual path record databus 633 via tri-state drivers 621 through 624. Combinatorial logic 634 will generate a high signal 635 to indicate a hit.

If no tag field matches, then combinatorial logic 634 will generate a low signal 635 to indicate a miss, i.e. that no valid virtual path record was found in the virtual path cache.

Hash Function

Figure 7:
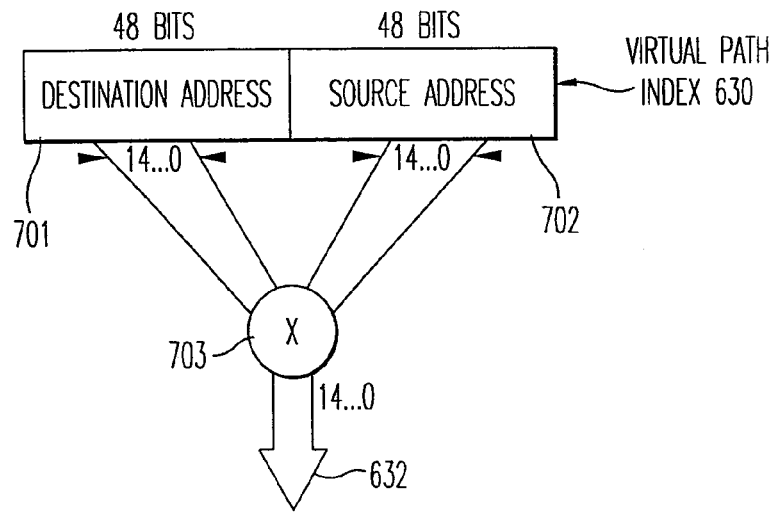
FIG. 7 is a block diagram of the virtual path hash function.

FIG. 7 illustrates a specific hash function embodied in hash function logic 631. Again, this hash function is used for illustration only. It will be apparent to anyone skilled in the art that other hash functions from the one shown can be used.

Referring now to FIG. 7, the specific hash function logic is the bitwise Exclusive-OR 703 between the low-order 15 bits of the destination address 701 and the source address 702 of the Virtual Path Index 630, producing the 15 bit virtual path cache index 632. A bit-wise Exclusive-OR function is used because it is simple and fast to implement. The low-order address bits are used from both source and destination address since they change with the highest frequency.

Packet Transmission

Figure 8:
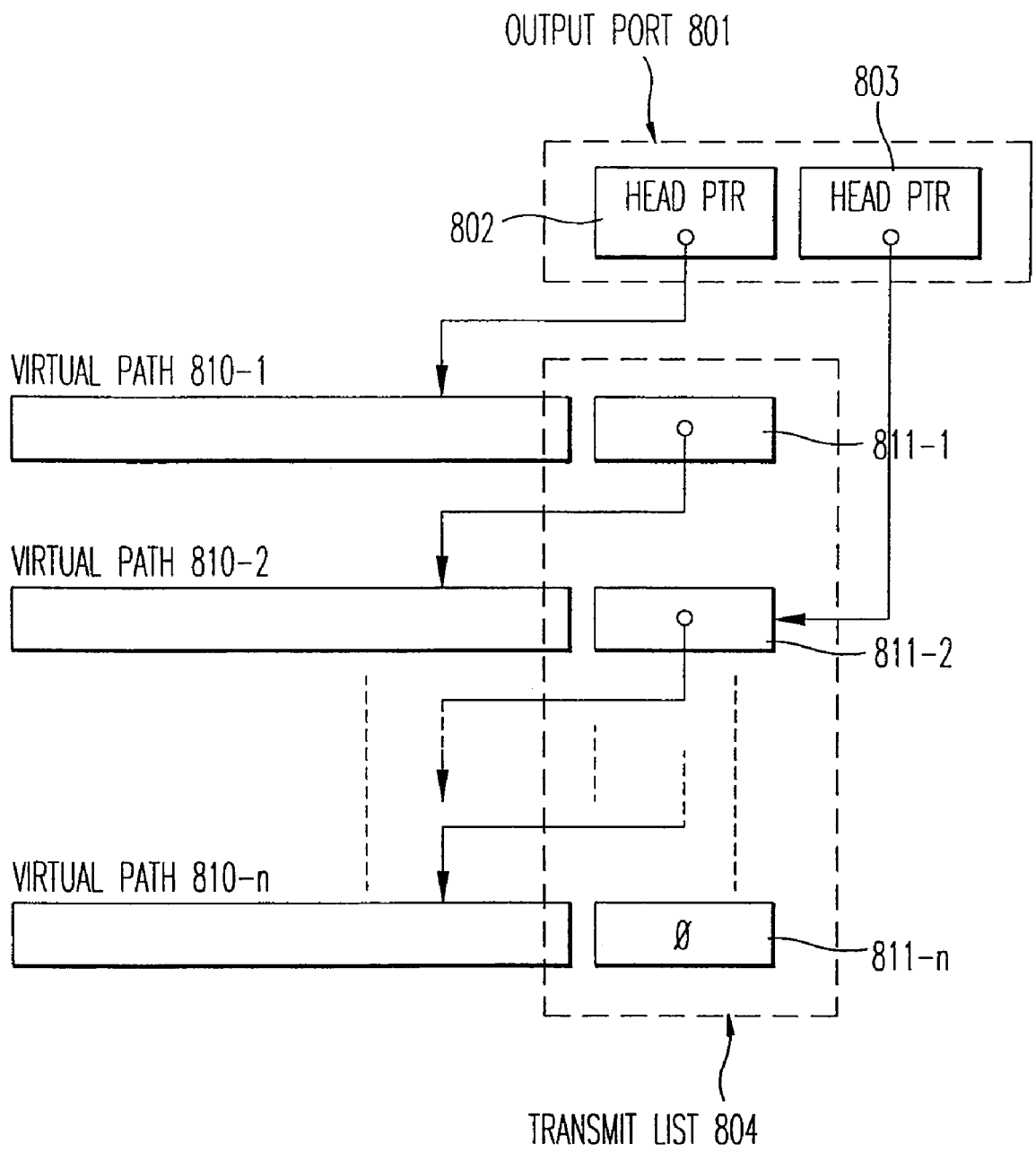
FIG. 8 is a block diagram of the transmit data structure.

FIG. 8 shows a data structure that illustrates how an output port transmits datagram packets buffered in the switch shared memory. This particular structure design is for purposes of illustration only; it will be apparent to anyone skilled in the art that other data structures from the one shown can be used successfully.

The data structure in FIG. 8 is for one output port only. Referring briefly to FIG. 4, each output port 405 through 408 in the switch hardware 409 has a similar data structure to that shown in FIG. 8.

Output port 801 is to transmit datagrams buffered and waiting for transmission on virtual paths 810-1, 810-2 through 810-n, where n is a selected integer.

The output port 801 has a head pointer 802 and current pointer 803. Head pointer 802 points to the first entry 810-1 in the transmit list 804, which links to the next entry 810-2. Current pointer 803 points to the entry from which datagrams are to be transmitted next, which is virtual path 810-2 in this example. The transmit list 804 is formed by the link fields 811-1 through 811-n. Each link field points to the next path in the transmit list. The last link entry 811-n in the transmit list 804 has a link field value of O. The actual length of the transmit list 804 will vary as a function of the number of paths that have datagrams pending for transmission on output port 801. If no path is waiting to transmit on output port 801 then the value of both head pointer 802 and current pointer 803 is 0.

The next datagram to be sent on output port 801 is determined by current pointer 803 which points to the next entry in the transmit list 804 of linked virtual path entries. This method of organizing the output list 804 as a chain of all virtual paths waiting to transmit on output port 801 has the effect of giving round robin priority to datagram packets waiting to be transmitted from different virtual paths.

A mechanism is also provided to send datagram packets from selected virtual paths at a higher priority than other virtual paths. If the priority field 322 in the virtual path record 300 is set, then the value in the priority field 322 indicates the number of packets to be transmitted from a virtual path before transmitting a packet from the next path in the transmit list 804.

Overall Switch and Network Operation

Referring to FIGS. 1 through 8, the overall operation of the system shall now be described.

For purposes of illustration, assume that client station 120 (FIG. 1) wants to send a datagram packet 200 (FIG. 2) to server station 126. Datagram 200 will be received on switch input port 401 (FIG. 4). Switch hardware generates virtual path index 630 from the datagram destination and source address fields and sends virtual path index signals on bus 421 to virtual path cache 415 for lookup.

The virtual path index in cache 415 will be converted by hash logic 631 to a virtual path cache index 632 (FIGS. 6 and 7) that indexes the four set associative virtual path cache 601 through 604 (FIG. 6). The virtual path index is further compared in parallel against the outputs from the four set associate cache 601 through 604 via the four comparators 611 through 614. Assuming a valid virtual path tag was found in SRAM cache 601 then comparator 611 will indicate a "hit" signal on hit/miss wire 635 and enable tri-state buffer 621 to output the virtual path record stored in SRAM cache 601 on virtual path record bus 633.

Switch hardware 409 then forwards and processes the datagram packet according to the fields of the virtual path record on bus 633 (FIGS. 6 and 4). If the virtual path cache had not contained a valid virtual path cache entry then it would indicate "miss" on the hit/miss wire 635 (FIGS. 6 and 4). This causes the switch hardware to forward the packet to the CPU 411 via CPU interface 412 for processing. The controller CPU 411 then processes the packet in software and sends it back to the switch hardware 409 to output on the appropriate output port. If controller CPU 411 determines that future datagram packets of this virtual path should be processed by switch hardware, controller CPU 411 then creates a new virtual path record for said virtual path and writes it into virtual path cache 415 replacing the least recently used entry if necessary.

Several advantages flow from this invention. For example, the invented method and structure:

1. supports reliable and efficient data communication in datagram networks without dropping datagram packets due to lack of network resources;
2. allows the specification of the attributes of datagram packet flows similar to the capabilities available in a virtual circuit packet switched network, but without the disadvantages of having to set up, maintain, and tear down virtual circuits; and
3. is compatible with existing network protocols and applications, and interoperates with the installed base of datagram network interfaces.

The other embodiments of this invention may be obvious to those skilled in the art. The above description is illustrative only and not limiting.

What is claimed is:

1. A method comprising:
   receiving a plurality of flows, each flow comprising a plurality of packets, a first flow comprising a plurality of first packets, each first packet having the same source-destination address pair as the other first packets, a second flow comprising a plurality of second packets, each second packet having the same source-destination address pair as the other second packets; and
   performing the following for each flow:
      identifying a virtual path of a plurality of virtual paths for the each flow, each virtual path having a corresponding path record stored in a memory;
      accessing the path record corresponding to the virtual path;
      allocating one or more packet buffers to the each flow according to the corresponding path record;
      determining, from a priority field of the path record of the virtual path of the first flow, a specific number of packets to send from the virtual path of the first flow before sending any packets from a next virtual path listed on a transmit list of virtual paths with packets pending for transmission, wherein the next virtual path is the virtual path of the second flow, the priority field of the path record designating the specific number;
      sending the specific number of first packets before sending any of the second packets;
      receiving a next packet;
      determining that the next packet is not associated with a path record stored in the memory;
      generating a new path record to process the next packet; and
      storing the new path record in the memory, wherein if the memory has insufficient space to store the new path record, one or more of the plurality of path records are removed from the memory before storing the new path record.

2. The method of claim 1, further comprising:
   receiving a next packet;
   identifying a next virtual path of a plurality of virtual paths for the next packet; and
   buffering the next packet in the one or more packet buffers allocated to the next virtual path.

3. The method of claim 1, the performing the following for each flow further comprising:
   allocating bandwidth to the each flow according to the path record.

4. The method of claim 1, the performing the following for each flow further comprising:
   controlling a flow between a plurality of network nodes according to the path record.

5. The method of claim 1, the performing the following for each flow further comprising:
   selecting a multicast mode for the each flow according to the path record.

6. The method of claim 1, the performing the following for each flow further comprising:
   selecting a snoop mode for the each flow according to the path record.

7. The method of claim 1, further comprising:
   receiving a packet of a flow;
   determining from the path record of the virtual path of the flow that the virtual path is in a snoop mode; and
   sending a copy of the packet to a CPU for processing.

8. The method of claim 1, the performing the following for each flow further comprising:
   selecting a priority for the each flow according to the path record.

9. An apparatus comprising:
   one or more ports configured to receive a plurality of flows, each flow comprising a plurality of packets, a first flow comprising a plurality of first packets, each first packet having the same source-destination address pair as the other first packets, a second flow comprising a plurality of second packet, each second packet having the same source-destination address pair as the other second packets; and
   switch hardware configured to perform the following for each flow:
      identify a virtual path of a plurality of virtual paths for the each flow, each virtual path having a corresponding path record stored in a memory;
      access the path record corresponding to the virtual path;
      allocate one or more packet buffers to the each flow according to the corresponding path record;
      determine, from a priority field of the path record of the virtual path of the first flow, a specific number of packets to send from the virtual path of the first flow before sending any packets from a next virtual path listed on a transmit list of virtual paths with packets pending for transmission, wherein the next virtual path is the virtual path of the second flow, the priority field of the path record designating the specific number;
      send the specific number of first packets before sending any of the second packets;
      receive a next packet;
      determine that the next packet is not associated with a path record stored in the memory;
      generate a new path record to process the next packet; and
      store the new path record in the memory, wherein if the memory has insufficient space to store the new path record, one or more of the plurality of path records are removed from the memory before storing the new path record.

10. The apparatus of claim 9:
    the one or more ports configured to:
       receive a next packet; and
    the switch hardware configured to:
       identify a next virtual path of a plurality of virtual paths for the next packet; and buffer the next packet in the one or more packet buffers allocated to the next virtual path.

11. The apparatus of claim 9, the switch hardware configured to perform the following for each flow:
   allocate bandwidth to the each flow according to the path record.

12. The apparatus of claim 9, the switch hardware configured to perform the following for each flow:
   control a flow between a plurality of network nodes according to the path record.

13. The apparatus of claim 9, the switch hardware configured to perform the following for each flow:
   select a multicast mode for the each flow according to the path record.

14. The apparatus of claim 9, the switch hardware configured to perform the following for each flow:
   select a snoop mode for the each flow according to the path record.

15. The apparatus of claim 9:
   the one or more ports configured to:
      receive a packet of a flow; and
   the switch hardware configured to:
      determine from the path record of the virtual path of the flow that the virtual path is in a snoop mode; and
      send a copy of the packet to a CPU for processing.

16. The apparatus of claim 9, the switch hardware configured to perform the following for each flow:
   select a priority for the each flow according to the path record.

* * * * *